(12) United States Patent
Avinger

(10) Patent No.: US 7,234,671 B2
(45) Date of Patent: Jun. 26, 2007

(54) ADJUSTABLE HANGERS

(75) Inventor: Andrew G. Avinger, Lubbock, TX (US)

(73) Assignee: Emerald Innovations, Inc., Butler, PA (US)

( * ) Notice: Subject to any disclaimer, the term of this patent is extended or adjusted under 35 U.S.C. 154(b) by 0 days.

(21) Appl. No.: 11/057,563

(22) Filed: Feb. 14, 2005

(65) Prior Publication Data

US 2005/0189458 A1 Sep. 1, 2005

Related U.S. Application Data

(63) Continuation of application No. 09/779,799, filed on Feb. 8, 2001, now Pat. No. 6,857,608.

(51) Int. Cl.
*A47B 96/06* (2006.01)

(52) U.S. Cl. ............... 248/215; 248/222.11; 248/304; 248/307; 248/339

(58) Field of Classification Search .............. 248/215, 248/222.11, 224.7, 295.11, 297.31, 301, 304, 248/307, 322, 339, 496; 211/113, 117, 119.004; 403/326, 329, 330, 105, 108
See application file for complete search history.

(56) References Cited

U.S. PATENT DOCUMENTS

| 599,325 | A | * | 2/1898 | Fitzgerald | 248/496 |
|---|---|---|---|---|---|
| 972,579 | A | * | 10/1910 | Shepard | 248/496 |
| 1,242,309 | A | * | 10/1917 | Backerud | 248/496 |
| 1,474,660 | A | | 11/1923 | White | |
| 3,072,938 | A | * | 1/1963 | Phaneuf | 15/22.1 |
| 3,662,617 | A | * | 5/1972 | Bennett et al. | 74/502.4 |
| 3,664,628 | A | | 5/1972 | Sneller | |
| 4,223,864 | A | * | 9/1980 | Harlow | 248/490 |
| 4,387,873 | A | | 6/1983 | Pavlo | |
| 4,416,040 | A | * | 11/1983 | Towsley | 28/152 |
| 4,557,455 | A | * | 12/1985 | Benjamin | 248/496 |
| 4,709,891 | A | | 12/1987 | Barnett | |
| 5,221,064 | A | * | 6/1993 | Hodges | 248/59 |
| 5,368,267 | A | | 11/1994 | Howard | |
| 5,487,517 | A | | 1/1996 | Smith | |
| 5,595,364 | A | * | 1/1997 | Protz, Jr. | 248/205.5 |
| 5,738,319 | A | | 4/1998 | Grassi | |
| 5,845,454 | A | * | 12/1998 | Malizia | 52/713 |
| 5,950,337 | A | | 9/1999 | Lehrman | |
| 6,302,365 | B1 | | 10/2001 | Catanzarite | |
| 6,311,851 | B1 | * | 11/2001 | Knudsen et al. | 211/13.1 |
| 6,364,260 | B1 | | 4/2002 | Lorincz | |
| 6,378,827 | B1 | | 4/2002 | Kacines | |
| 6,575,416 | B1 | | 6/2003 | Avinger | |
| 6,663,069 | B1 | | 12/2003 | Norberg | |
| 6,848,660 | B2 | | 2/2005 | Jackson | |
| 6,854,610 | B2 | | 2/2005 | Adams | |

* cited by examiner

*Primary Examiner*—Korie Chan
(74) *Attorney, Agent, or Firm*—Calfee, Halter & Griswold, LLP

(57) ABSTRACT

An adjustable wreath hanger, preferably made of molded plastic, is disclosed herein that preferably comprises a hanger strip attachable to the top of a door or other object and a hook strip that slidably engages the hanger strip to permit selective variation of the distance between a rearwardly facing door hook and a forwardly facing wreath hook. The hanger strip preferably comprises a plurality of forwardly facing detent members into which a tooth projecting rearwardly from an engagement tab on the hook strip can be selectively engaged or disengaged to vary the relative positions of the two strips, thereby effectively elongating the length of the wreath hanger.

12 Claims, 3 Drawing Sheets

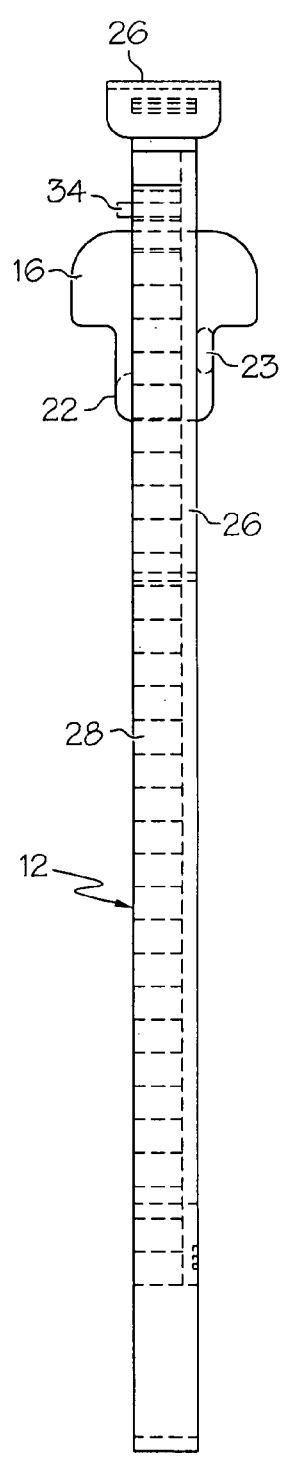
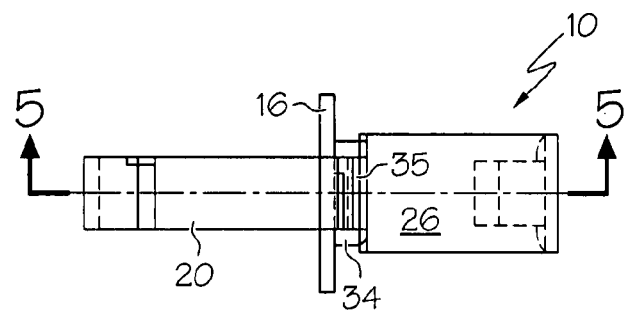
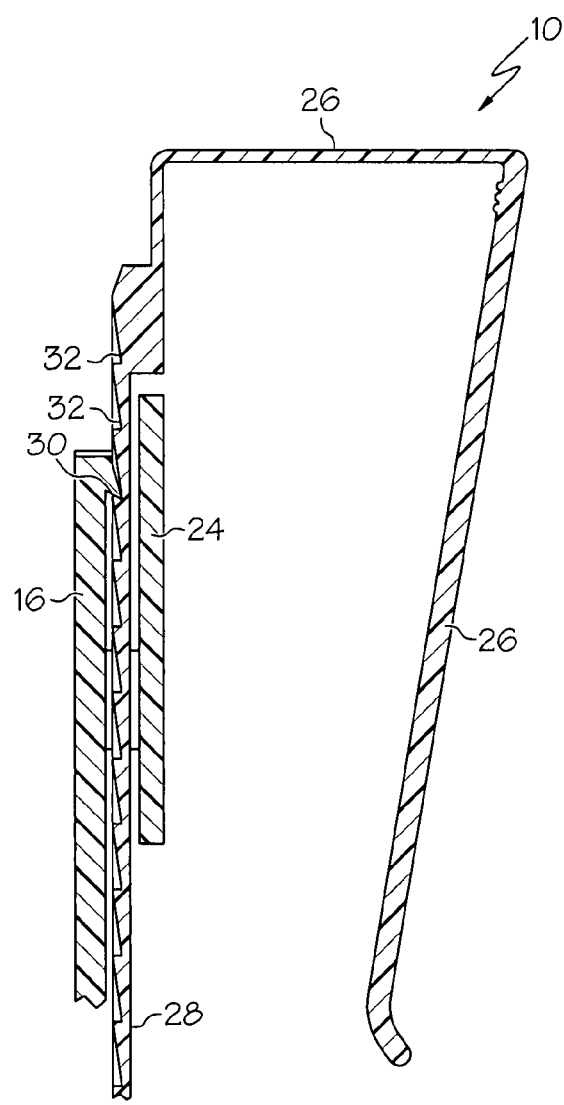
FIG. 3
FIG. 4
FIG. 5

ADJUSTABLE HANGERS

PRIORITY CLAIM

This application claims priority to, and is a continuation based on U.S. patent application Ser. No. 09/779,799, Filed on Feb. 8, 2001, now U.S. Pat. No. 6,857,608, which is incorporated herein by reference in its entirety.

BACKGROUND OF THE INVENTION

1. Field of the Invention

This invention relates to a molded plastic article that is useful for supporting an object such as a decorative wreath or garland against the front surface of a door, over a cemetery headstone, or the like. More particularly, the invention relates to a molded plastic wreath hanger having a rearwardly facing "over-the-door" hook and also having a forwardly facing wreath-support hook, with the distance between the two hooks being selectively adjustable by the user.

2. Description of Related Art

Molded plastic wreath hangers are previously known, having been disclosed, for example, in U.S. Des. 365,015. Because the preferred distance from the top of the door to the forwardly facing support hook on the face of a door can vary according to factors such as the height of the door, size of the wreath, etc., molded plastic wreath hangers made so as to permit selective adjustment of that distance by the user are desirable. In the past, some manufacturers addressed this need by producing molded hangers of different lengths. More recently, U.S. Pat. No. 5,553,823 and U.S. Des. 374,168 disclosed wreath hangers having extension members of predetermined lengths that can be inserted by the user between the "over-the-door" hook and the forwardly facing hook to vary the overall length of the hanger. Unfortunately, such hangers limit the degree of adjustability according to the predetermined lengths of the extension members. U.S. Pat. No. 5,413,297 discloses a wreath hanger having a bracket having a locking nub that is used in combination with a separate hook arm, but that structure is not seen to be adjustable to vary the vertical separation between the top of the door and the hook.

A wreath hanger is therefore needed that is easily and selectively adjustable by the user to position the forwardly facing hook member of a wreath hanger a desired distance below the top of a door from which it hangs.

SUMMARY OF THE INVENTION

An adjustable wreath hanger, preferably made of molded plastic, is disclosed herein that preferably comprises a hanger strip attachable to the top of a door or other object and a hook strip that slidably engages the hanger strip to permit selective variation of the distance between a rearwardly facing door hook and a forwardly facing wreath hook. The hanger strip preferably comprises a plurality of forwardly facing detent members into which a tooth projecting rearwardly from an engagement tab on the hook strip can be selectively engaged or disengaged to vary the relative positions of the two strips, thereby effectively elongating the length of the wreath hanger.

BRIEF DESCRIPTION OF THE DRAWINGS

The apparatus of the invention is further described and explained in relation to the following figures of the drawings wherein:

FIG. 3 is a rear elevation view of the adjustable wreath hanger of FIG. 1;

FIG. 4 is a top plan view of the adjustable wreath hanger of FIG. 2;

FIG. 5 is an enlarged, cross-sectional view taken along line 5—5 of FIG. 4, with the lower portions of the hook and hanger strips being broken away;

Like reference numerals are used to indicate like parts in all figures of the drawings.

DESCRIPTION OF THE PREFERRED EMBODIMENTS

Figure 1:
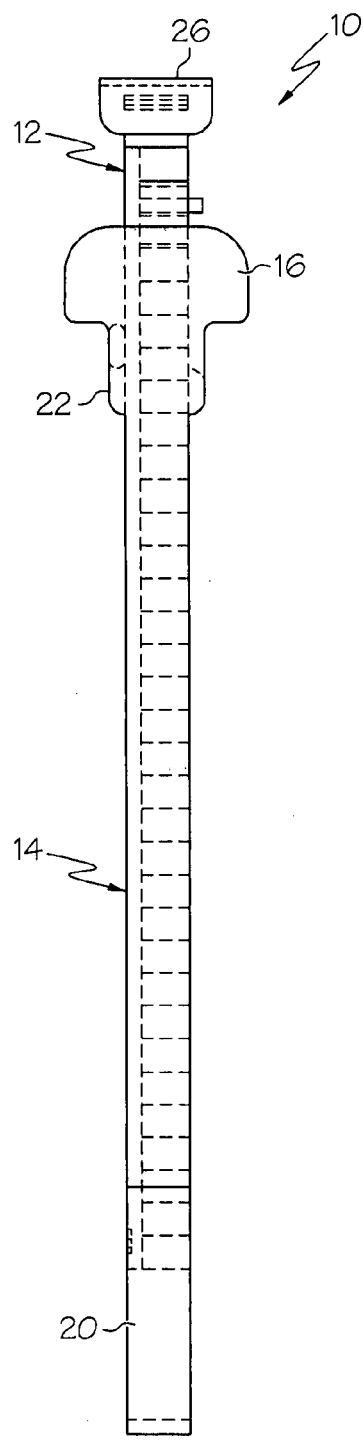
FIG. 1 is a front elevation view of a preferred embodiment of the adjustable wreath hanger of the invention.

Referring to FIGS. 1–4, adjustable wreath hanger 10 of the invention preferably comprises elongated hanger strip 12 and elongated hook strip 14, both of which are preferably injection molded from a suitable thermoplastic resin, most preferably polycarbonate. Hanger strip 12 further comprises a rearwardly facing hook member 26 at its upper end. Hook member 26 is preferably constructed in such manner that it will fit snugly over the top of a conventional door, and sufficiently resilient that it can accommodate doors of various thicknesses within an acceptable, predetermined range. The portion of hanger strip 12 extending downwardly from hook member 26 preferably comprises a detent section 28 having a plurality of vertically separated, forwardly facing detent members 32.

Hook strip 14 further comprises a forwardly facing hook 20 at or near its lower end and an upwardly extending strip portion 18 having disposed near its upper end a resilient engagement tab 16 having a rearwardly facing projection 30, a slide member 22 attached to and cooperating with engagement tab 16 to define an aperture 35 through which downwardly extending detent section 28 of hanger strip 12 is insertable to create an interfering fit between rearwardly facing projection 30 and detent members 32. Slide member 22 preferably further comprises an upwardly extending, resilient backing tab 24 spaced part from rearwardly facing projection 30, the backing tab biasing an aligned detent member 32 of banger strip 12 into engagement with rearwardly facing projection 30 of hook strip 14 to maintain a predetermined vertical separation between door hook 26 and hook 20 during use, Rearwardly facing projection 30 and detent members 32 are preferably shaped so as to enable the projection 30, preferably an angular tooth having a width slightly less than the width of strip portion 18, to override detent members 32 whenever the hook strip slides upwardly relative to the hanger strip. Rearwardly projecting bosses 23a and 23b on the back of engagement tab 16 assist in keeping strip portion 18 and detent section 28 cooperatively aligned whenever hanger strip 12 and hook strip 14 are moved in slidable relation to each other.

Figure 2:
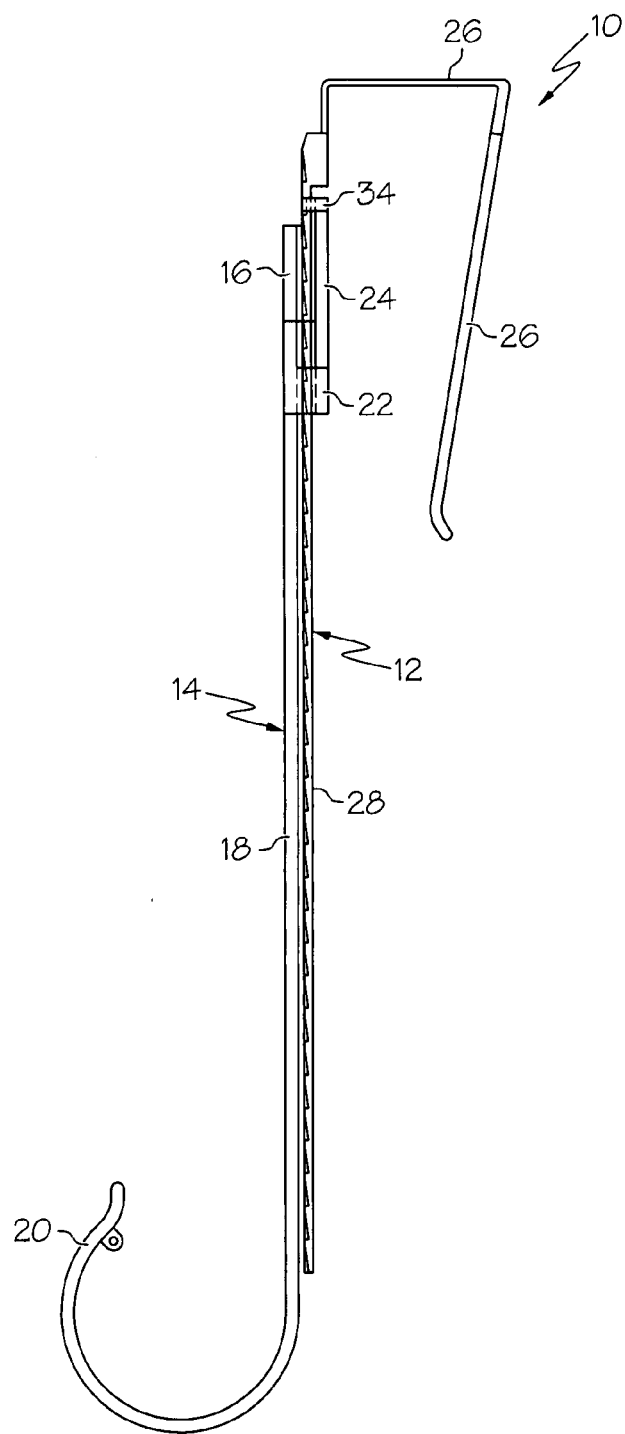
FIG. 2 is a right side elevation view of the adjustable wreath hanger of FIG. 1.

Referring to FIG. 5, when adjustable wreath hanger 10 is constructed as described above, hook strip 14 can be moved upwardly over hanger strip 12 with little effort when not under load to shorten the vertical separation between door hook 26 and hook 20. However, backing tab 24 preferably has a forwardly extending projection 34, visible in FIGS. 2–4, that biases detent members 32 of hanger strip 12 against rearwardly facing projection 30 to prevent hook strip 14 from sliding downwardly in relation to the hanger strip 12 whenever hook 20, visible in FIGS. 1, 2 and 4, is under load. Therefore, in order to increase the vertical separation between door hook 26 and hook member 20 when desired, detent section 28 must first be flexed backwardly away from engagement tab 16 and rearwardly facing projection 30. This adjustment is most easily accomplished when hook 20 is not under load and when door hook 26 is not attached to a door.

Figures 6, 7:
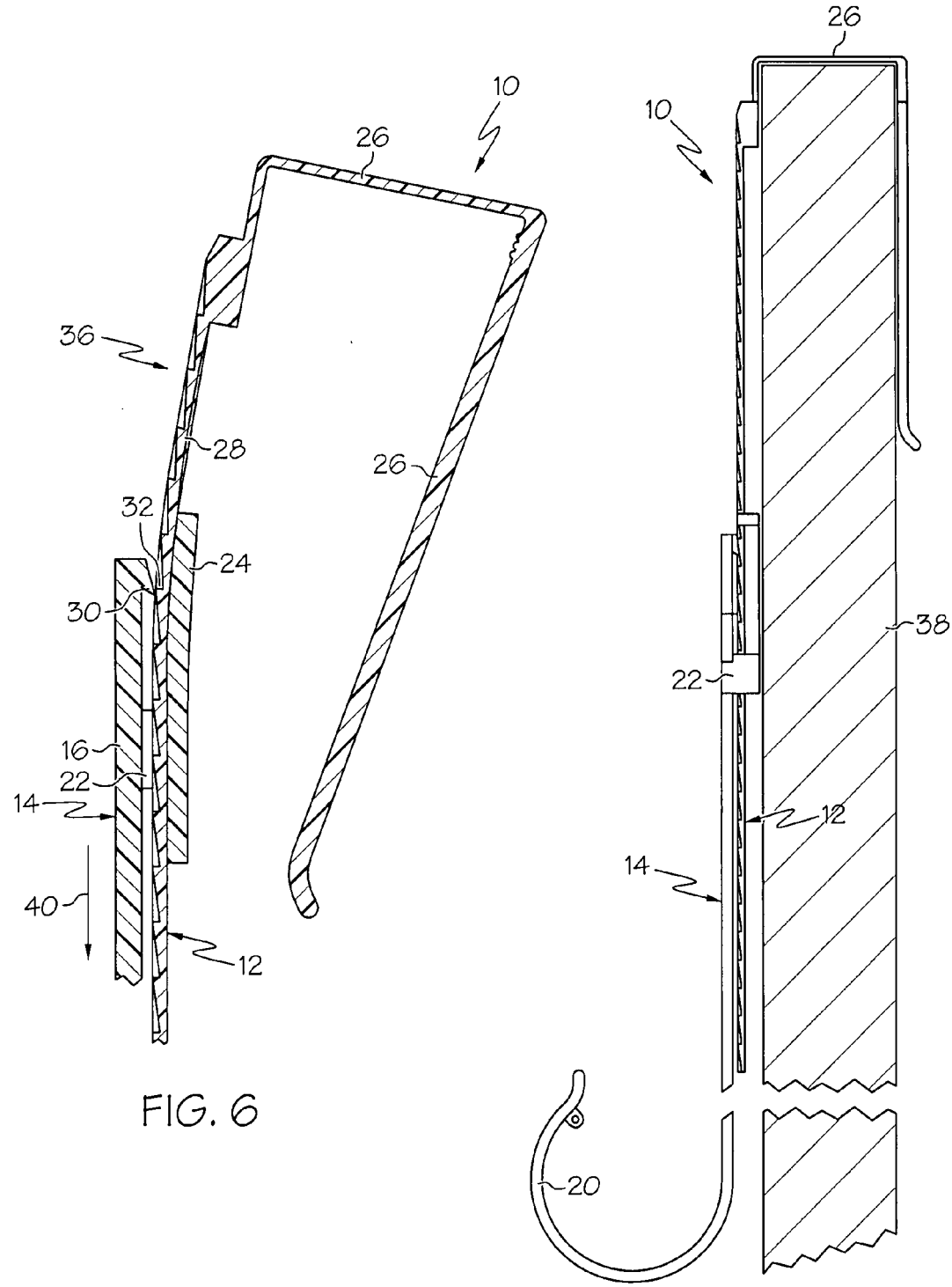
FIG. 6 is a cross-sectional view similar to that of FIG. 5, but with the upper portion of the hanger strip being flexed rearwardly to disengage the tooth of the hook strip from a detent of the hanger strip, thereby permitting the hook strip to be adjusted downwardly relative to the hanger strip.
FIG. 7 is a side elevation view as in FIG. 2, but shown installed on a door with the hook strip being adjusted downwardly relative to the hanger strip from the position shown in FIG. 2.

Referring to FIG. 6, the application of a rearwardly directed manual force as signified by arrow 36 against detent section 28 causes backing tab 24 to flex rearwardly as well, creating separation between rearwardly facing projection 30 and forwardly facing detent member 32. This separation allows slide 22 of hook strip 14 to be moved downwardly relative to hook strip 12 as indicated by arrow 40. When the desired vertical separation between door hook 26 and hook 20 is achieved, force 36 can be withdrawn, enabling backing tab 24 to bias whatever detent member 32 is then aligned with rearwardly facing projection 30 back into engagement with projection 30, "locking" hanger strip 12 and hook strip 14 back into substantially fixed relation to each other when hook 20 is placed under load.

FIG. 7 depicts adjustable wreath hanger 10 of the invention installed over door 38, with hook strip 14 shifted downwardly relative to hanger strip 12 as compared to the positions depicted in FIGS. 1–4, thereby increasing the vertical separation between door hook 26 and hook 20.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

The invention claimed is:

1. An adjustable hanger for hanging an object from a support comprising:
    a first strip comprising an upper end having a rearwardly facing support hook for engaging the support and a lower engagement end having multiple vertically-spaced recesses,
    a second strip comprising a lower end having a forwardly facing object hook for carrying the object and an upper engagement end comprising a flexible engagement tab having at least one rearwardly facing projection, and
    a slide member having an aperture through which the lower engagement end of the first strip is inserted, the at least one rearwardly facing projection being biased by the slide member into engagement with at least one recess to maintain a vertical separation between the upper end of the first strip and the lower end of the second strip when the adjustable hanger carries the weight of the object, and
    wherein the at least one rearwardly facing projection is disengageable from the at least one recess by the application of a rearwardly directed force to the first strip at the location where the first strip is inserted into the slide member, thereby enabling the free movement of the second strip in an upward or downward direction relative to the first strip.

2. The adjustable hanger according to claim 1, wherein at least one of said first and second strips is elongated.

3. The adjustable hanger according to claim 1, wherein the upper end of the first strip comprises a flexible hanger.

4. The adjustable hanger according to claim 1 wherein the first strip defines a plurality of vertically separated teeth and wherein the at least one rearwardly facing projection of the second strip is shaped to engage therewith.

5. The adjustable hanger according to claim 4, wherein the plurality of recesses of the first strip override the at least one rearwardly facing projection of the second strip when the lower strip slides upwardly relative to the upper strip.

6. The adjustable hanger according to claim 1, wherein the first strip and the second strip are both molded from polycarbonate resin.

7. An adjustable hanger comprising:
    a first strip comprising an upper end having a rearwardly facing support hook and a lower engagement end having one or more recesses,
    a second strip comprising a lower end having a forwardly facing object hook and an upper engagement end comprising a flexible engagement tab having at least one rearwardly facing projection, and a slide member having an aperture through which the lower engagement end of the first strip is inserted, the at least one rearwardly facing projection being biased by the slide member into engagement with at least one recess to maintain a vertical separation between the upper end of the first strip and the lower end of the second strip, and
    wherein the slide member comprises a backing tab spaced apart from the rearwardly facing projection, wherein the at least one rearwardly facing projection is disengageable from the at least one of the plurality of recesses of the first strip by the application of a rearwardly directed force to the backing tab, thereby enabling the free movement of the second strip in an upward or downward direction relative to the first strip.

8. The adjustable hanger according to claim 7, wherein the backing tab aids in the alignment of the engaged first and second strips.

9. An adjustable hanger, comprising:
    a first strip comprising an upper end having a rearwardly facing support hook and a lower engagement end having a plurality of vertically aligned teeth; and
    a second strip comprising a lower end having a forwardly facing object hook and an upper engagement end comprising at least one rearwardly facing projection, and a slide member comprising a backing tab spaced apart from the rearwardly facing projection and having an aperture though which the lower engagement end of the first strip is inserted, the at least one rearwardly facing projection and at least one of the plurality of vertically aligned teeth being biased by the slide member into engagement with one another to maintain a vertical separation between the upper end of the first strip and the lower end of the second strip, wherein the at least one rearwardly facing projection is disengageable from the at least one of the plurality of vertically aligned teeth by the application of a rearwardly directed force to the backing tab, thereby enabling the free movement of the second strip in an upward or downward direction relative to the first strip.

10. An adjustable hanger, comprising:
    a first strip comprising an upper end having a rearwardly facing flexible hanger hook and a lower engagement end having a plurality of vertically aligned teeth; and
    a second strip comprising a lower end having a forwardly facing object hook and an upper engagement end comprising a flexible engagement tab having at least one rearwardly facing projection, and a slide member comprising a backing tab spaced apart from the rearwardly facing projection and having an aperture through which the lower engagement end of the first strip is insertable, whereby when the lower engagement end of the first strip is inserted into the aperture of the slide member, the at least one rearwardly facing projection and at least one of the plurality of vertically aligned teeth being biased by the slide member into engagement with one another to maintain a vertical separation between the hanger hook of the first strip and the forwardly facing hook of the second strip, wherein the at least one rearwardly facing projection is disengageable from the at least one of the plurality of vertically aligned teeth by the application of a rearwardly directed force to the backing tab, thereby enabling the free movement of the second strip in an upward or downward direction relative to the first snip.

11. An adjustable banger comprising:

a first strip comprising an upper end having a rearwardly facing support hook and a downwardly extending end having a plurality of vertically separated, forwardly facing detent members; and a second strip comprising a lower end having a forwardly facing object hook and an upper end, the upper end having an engagement tab having a rearwardly facing projection, a slide member attached to and cooperating with the upper end of the second strip to define an aperture through which the downwardly extending end of the first strip is inserted to create an interfering fit between the rearwardly facing projection the detent members, the slide member further comprising an upwardly extending, resilient backing tab spaced apart from the rearwardly facing projection, the backing tab biasing one of the forwardly facing detent members aligned therewith into engagement with the rearwardly facing projection to maintain a predetermined vertical separation between the upper end of the first strip and the lower end of the second strip during use, the at least one rearwardly facing projection being disengageable from the at least one of the plurality of vertically separated, forwardly facing detent members by the application of a rearwardly directed force to the backing tab, thereby enabling the free movement of the second strip in an upward or downward direction relative to the first strip.

12. An adjustable hanger comprising:

an elongated hanger strip comprising an upper end and a downwardly extending end, said upper end comprising a rearwardly facing support hook, and said downwardly extending end comprising a plurality of vertically separated, forwardly facing detent members; and an elongated hook strip comprising a lower end and an upper end, said lower end comprising a forwardly facing hook member, and said upper end comprising a resilient engagement tab having a rearwardly facing projection, a slide member attached to and cooperating with the upper end of the hook strip to define an aperture through which the downwardly extending end of the hanger strip is insertable to create an interfering fit between the rearwardly facing projection of the hook strip and the detent members of the hanger strip, the slide member further comprising an upwardly extending, resilient backing tab spaced apart from the rearwardly facing projection, the resilient backing tab biasing one of said forwardly facing detent members aligned therewith of the hanger strip into engagement with the rearwardly facing projection of the hook strip to maintain a predetermined vertical separation between the support hook and the forwardly facing hook member during use.

\* \* \* \* \*